United States Patent
Kaszkin et al.

(10) Patent No.: US 7,643,639 B2
(45) Date of Patent: Jan. 5, 2010

(54) PROCESS AUTOMATION SYSTEM AND PROCESS DEVICE FOR A PROCESS AUTOMATION SYSTEM

(75) Inventors: Andreas Kaszkin, Kandel (DE); Wolfgang Stiehl, Woerth (DE)

(73) Assignee: Siemens Aktiengesellschaft, Munich (DE)

( * ) Notice: Subject to any disclaimer, the term of this patent is extended or adjusted under 35 U.S.C. 154(b) by 1141 days.

(21) Appl. No.: 10/717,667

(22) Filed: Nov. 21, 2003

(65) Prior Publication Data

US 2004/0168053 A1     Aug. 26, 2004

Related U.S. Application Data

(63) Continuation of application No. PCT/DE02/01766, filed on May 16, 2002.

(30) Foreign Application Priority Data

May 21, 2001    (DE)   .................. 101 24 800

(51) Int. Cl.
*H04L 9/00*      (2006.01)
(52) U.S. Cl. .................. 380/277; 713/153; 713/171; 707/8; 700/17; 700/19
(58) Field of Classification Search ................. 380/277; 700/17, 19, 110, 181; 235/380, 375, 379; 713/162, 153, 171; 707/8, 1, 10
See application file for complete search history.

(56) References Cited

U.S. PATENT DOCUMENTS

| 5,109,152 | A  | * | 4/1992  | Takagi et al. | ................. 235/380 |
| 6,115,646 | A  | * | 9/2000  | Fiszman et al. | ............. 700/181 |
| 6,131,160 | A  | * | 10/2000 | Dillon et al. | ................. 713/162 |
| 6,473,664 | B1 | * | 10/2002 | Lee et al. | ..................... 700/110 |
| 6,507,856 | B1 | * | 1/2003  | Chen et al. | ................... 715/205 |
| 6,826,432 | B2 | * | 11/2004 | Beck et al. | .................... 700/18 |
| 7,013,185 | B2 | * | 3/2006  | Simon | ......................... 700/19 |

FOREIGN PATENT DOCUMENTS

| DE | 691 09469 | 9/1991 |
| DE | 196 32 180 A1 | 2/1998 |
| DE | 198 48 618 A1 | 6/2000 |
| DE | 199 19 874 A1 | 11/2000 |
| EP | 0 978 775 A1 | 2/2000 |
| WO | WO 91/13523 A1 | 9/1991 |

* cited by examiner

*Primary Examiner*—Thanhnga B Truong
(74) *Attorney, Agent, or Firm*—Staas & Halsey LLP

(57) ABSTRACT

A process automation system in which process devices (1-6) execute predetermined functions as part of the process automation and exchange data (23, 24) relevant to functions and/or devices with the process automation system. Some but not all of the data (23, 24) are exchanged in encrypted form.

6 Claims, 1 Drawing Sheet

19 Function Device
20 Communication Device
21 Sensor
22 Calculation Unit
25 Encryption Device
26 Decryption Device
28 Memory 1-7 Field/Control Devices
10,15 Couplers
11 Control Devices
13 Control and Regulation Unit
17 External Sites
27 Key Administration 19 Function Device
20 Communication Device
21 Sensor
22 Calculation Unit
25 Encryption Device
26 Decryption Device
28 Memory

PROCESS AUTOMATION SYSTEM AND PROCESS DEVICE FOR A PROCESS AUTOMATION SYSTEM

This is a Continuation of International Application PCT/DE02/01766, with an international filing date of May 16, 2002, which was published under PCT Article 21(2) in German, and the disclosure of which is incorporated into this application by reference.

FIELD OF AND BACKGROUND OF THE INVENTION

This invention relates to a process automation system and a process device and method for such a process automation system.

There is a growing demand for transmission of data between a process automation system, or parts or components thereof, and external sites. Examples include remote programming, remote parameterization, remote servicing and remote diagnosis. Thus, it is known, e.g., from German Patent Application DE 198 48 618 A1 that, for remote servicing and/or diagnosis, data, e.g., a control command, to be transmitted from the external site to the process automation system may be packaged in an email, which is then addressed and sent to the process automation system. The email is then received within the process automation system by the addressee, who extracts the control command by decoding and relays it to the application for which the control command is intended. Conversely, in the same manner, data can be transmitted from the process automation system to external sites.

Special data links between the process automation system and the external sites are not necessary for this purpose, because standard data transmission systems (global and/or local data networks such as the Internet or Intranet) may be used in combination with an electronic firewall to protect the process automation system. Specifically, the electronic firewall allows email to pass through (so-called email tunneling).

To increase security against unauthorized penetration through the firewall of the process automation system, the data packaged in the email can be encrypted and then decrypted again on extraction from the email and prior to being forwarded. The encryption of the data to be transmitted to the external site and/or the decryption of the data received from the external site takes place within the process automation system in a single encryption/decryption device. It is therefore not readily possible to exchange a selected portion of the data, e.g., data relevant to security, between the process automation system and the external site in encrypted form, and to exchange the remaining data in unencrypted form. Rather, if encryption is provided, all the data to be exchanged via the electronic firewall are encrypted together. This, however, results in a corresponding complexity and a reduction in the data transmission rate. Furthermore, exchange of encrypted data between the process automation system and the external sites is limited to the pathway via the encryption and decryption device in the process automation system. It is therefore made impossible to communicate encrypted data at different sites within the process automation system. Finally, data to be transmitted can be manipulated within the process automation system before it is encrypted, and the received data can be manipulated within the process automation system after being decrypted.

Encryption of confidential data before transmission to a recipient is known in general. With the so-called public encryption method, the sender uses a public key of the authorized recipient for encrypting the data so that only this recipient is able to decrypt the data using his own private key. On the other hand, authentication of the sender can be performed by signing the data. To do so, the sender encrypts the data using his own private key, while the recipient uses the public key of the sender for decrypting the data. Data encrypted using public keys is not necessarily authentic, whereas data signed with private keys is not confidential. To establish both confidentiality and authenticity, encryption and signing can therefore be combined, whereby the sender first encrypts the data using his own private key and then encrypts it using the recipient's public key. Finally, to ensure the integrity, i.e., the authenticity, of the transmitted data, the sender can determine a test code which is transmitted to the recipient in signed form, i.e., encrypted with the sender's own private key. The recipient decrypts the test code using the sender's public key and compares the test code thus decrypted with the test code calculated from the received data. If the two test codes are identical, the integrity of the data is ensured.

OBJECTS OF THE INVENTION

One object of the present invention is to permit a flexible and at the same time secure and reliable handling of selected important data of a process automation system.

SUMMARY OF THE INVENTION

According to one formulation of the invention, this and other objects are achieved by a process automation system in which process devices execute predetermined functions as part of the process automation and exchange data relevant to the functions and/or the devices with the process automation system. Some of the data are exchanged in encrypted form.

In an inventive process automation system, process devices execute predetermined functions as part of the process automation and in doing so exchange data relevant to the function and/or device with the process automation system, at least some of the data being exchanged in encrypted form.

An inventive process device for a process automation system includes a function device for executing predetermined functions as part of the process automation and a communication device which is connected to the function device and can be connected to the process automation system for exchanging data relevant to the function and/or device with the process automation system. The communication device performs the exchange of some but less than all of the data in encrypted form.

The encryption and/or decryption of data is performed in the process devices, i.e., the senders and recipients of the data. The encrypted data is communicated within the process automation system in the same way as the unencrypted data. Process devices include field devices, control devices and other terminals, i.e., measuring transducers, actuators, drive mechanisms, analyzers, controllers and regulators. For example, measuring transducers are senders of measurement data and recipients of parameterization data used to parameterize them. To the extent to which this data is regarded as requiring security, it is exchanged in encrypted form with the process automation system via the communication device of the measuring transducer. Other data not classified as requiring security is exchanged in unencrypted form. Depending on the encryption, the encrypted data is protected from manipulation and/or can be received only by an authorized recipient, in which case the sender can also be authenticated. Senders and recipients of data may also include the process devices within the process automation system as well as external sites which can be connected to the process automation system in any desired manner.

The hardware, programming or parameterization of the process device, optionally performed with encryption, determines which data requires security and is therefore to be exchanged in encrypted form. Thus, transmitted data requiring security is automatically encrypted before being sent, and received data can be processed further in the process device only after decryption. In parallel with that, a portion of the data may be exchanged in both encrypted and unencrypted form. One example of this would be measurement data that is processed further in both the process automation system as part of control and regulation as well as being used for applications that require calibration or are used for official monitoring purposes, and therefore are encrypted. For example, weighing data of industrial scales capable of calibration may be encrypted and output to an external data storage device or a display without having to encapsulate the data transmission pathway, while at the same time, a bottling operation, for example, may be controlled using the unencrypted weighing data. Since the encrypted data is used here essentially for logging purposes, for example, it is possible to provide for the encrypted data to be communicated at a lower rank, i.e., at a lower priority, in comparison with the unencrypted data, so that the control and regulation processes using the unencrypted data are not impaired. In particular, it is possible to provide for the encrypted data to be collected first, and optionally provided with time stamps, before being communicated at a later point in time, e.g., bundled in a data packet.

BRIEF DESCRIPTION OF THE DRAWINGS

To further illustrate this invention, reference is made below to the figures of the drawing, in which, in particular.

DETAILED DESCRIPTION OF THE PREFERRED EMBODIMENTS

Figure 1:
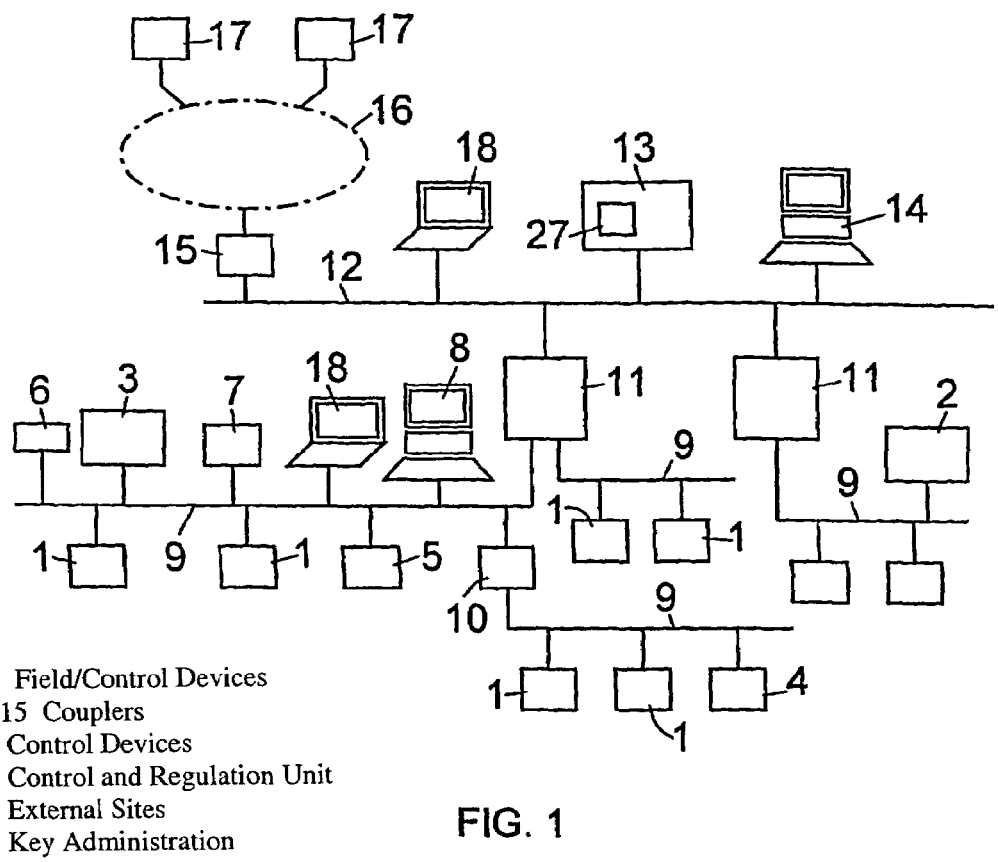
FIG. 1 shows an exemplary embodiment of an inventive process automation system and FIG. 2 shows an exemplary embodiment of an inventive process device.

FIG. 1 shows a schematic diagram of a process automation system having a plurality of process devices. These process devices execute predetermined functions as part of the process automation, and thereby exchange data that is relevant for the function and/or device with the process automation system. Process devices here are understood to include data terminals, i.e., senders and recipients of data. In particular, this includes field devices and control devices, e.g.: measuring transducers 1 for pressure, temperature, flow rate, filling level, etc.; analyzers 2 for gas or liquid analysis; weighing systems 3; position regulators for valves and other decentralized regulators 4; actuators 5; and recording and display devices 6. To exchange data within the process automation system, the process devices in the decentralized peripheral area are interlinked via field buses 9 or other communication pathways together with a decentralized control and regulation unit 7 and an operation and observation unit 8, with different field buses 9 being interlinked via bus couplers 10. The field buses 9 are in turn connected via control devices 11 to a central system bus 12, to which a central control and regulation unit 13 and an operation and observation unit 14 are also connected. The system bus 12 is connected via a coupling device 15 to a global communications network 16, e.g., the Internet, to permit data exchange with external sites 17, e.g., for remote servicing, remote diagnosis, remote parameterization, remote monitoring, etc., of the process automation system and/or of individual process devices. Finally, other external sites 18, e.g., programming devices, diagnostic devices or service devices may be connected at various points in the process automation system.

Predetermined data of the process automation system that require security are exchanged in encrypted form, with measures being taken to ensure, depending on the encryption, that this data is protected from manipulation on the path from the sender to the recipient and/or that it can be received only by an authorized recipient, in which case the sender is also authenticatable. Encryption and/or decryption is performed in the data terminals, i.e., in the senders and/or recipients, namely here the process devices and/or the external sites, with the encrypted data being transmitted within the process automation system exactly like the unencrypted data.

Figure 2:
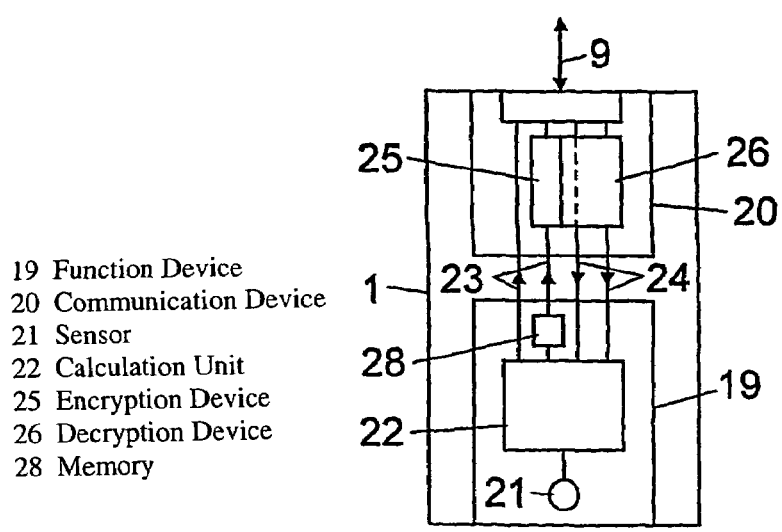

FIG. 2 shows a process device, for example a measuring transducer 1, here having a function device 19 for executing the measurement function and having a communication device 20, which is connected to the function device 19 and to the process automation system, in this case to the field bus 9, for exchanging data relevant to the function and/or device with the process automation system. The function device 19 includes a sensor 21 and a measured value acquisition and calculation unit 22, which generates measurement data, diagnostic data and/or other instrument-specific or function-specific data 23 and processes command data, parameterization data and/or other data 24 supplied to it. These transmission data 23 and reception data 24 are exchanged with the process automation system via the communication device 20 of the measuring transducer 1. Hard wiring or programming determines which of the transmission data 23 are encrypted in an encryption device 25. In the case of reception data 24, the communication device 20 recognizes which data is encrypted and decrypts this data in a decryption device 26.

Encryption and/or decryption of the data 23 and 24 takes place here according to the public encryption method. Each process device, i.e., the measuring transducer 1 here, has its own private key and a corresponding public key for this, the keys being stored in or generated by the measuring transducer 1. In contrast with the private key, which is stored inaccessibly, the public key is communicated to a central key administration 27 (FIG. 1) when the measuring transducer 1 is linked to the process automation system, e.g., in the startup of operation. The central key administration 27 is implemented either in a separate device or in a device that is already present, such as a programmable controller of the process automation system. External sites 18 wanting to exchange data with process devices automatically report in advance to the key administration 27, where they deposit their respective public key after their identity has been checked. The central key administration 27 ensures the authenticity of the public keys administered by having each signed using the private key of the key administration 27. As a result, the authenticity of the public key can be checked at any time with the help of the public key of the key administration 27.

For example, if a certain parameter in a process device 4, for example, is to be set by only an authorized external site 18, then the set value to be transmitted to the process device 4 is encrypted at the external site 18, so that the integrity of the set value is ensured when received by the process device 4, and furthermore, the process device 4 can ascertain the identity of the external site 18 and thus its authorization to set the parameter.

It is possible to provide for one and the same data, for example the measurement data of the measuring transducer 1, to be transmitted to certain recipients, for example a recording or display device that must be calibrated, in encrypted form, and to be sent to other recipients, for example the regulating devices responsible for further processing of the measurement data, in unencrypted form. As a rule, only data requiring security is transmitted in encrypted form; all other data, in particular data used for process control and regulation, is preferably transmitted mainly in unencrypted form. In order not to interfere with the process control and regulation, the unencrypted data is preferably communicated with a higher priority than the encrypted data. To this end, the encrypted data and/or the data to be encrypted may first be collected in a memory 28 of the process device 1.

The data encryption described here thus permits in particular a tamper-proof remote parameterization of process devices or authorized service from any remote sites, secure official monitoring of measured values or process states. It also enables tamper-proof transmission of security-relevant data and/or of confidential data, diagnostic data or system parameters, such as formulations, transmission of data capable of calibration without the requirement of encapsulation of the transmission pathways, etc.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A process automation system, comprising:
   process devices that execute predetermined functions as part of the process automation and thereby exchange data that are relevant to at least one of the functions and the devices within the process automation system,
   wherein some but less than all of the data are exchanged in encrypted form,
   wherein, in at least a first of the process devices, a communication device determines by hard wiring or programming which of transmission data are encrypted in an encryption device of the first process device, and
   wherein, in at least a second of the process devices, the communication device recognizes which of reception data are encrypted and decrypts the reception data in a decryption device of the second process device.

2. A process automation system as claimed in claim 1, wherein, of the data exchanged in the encrypted form, at least some of the same data are exchanged, in parallel, in an unencrypted form.

3. A process automation system as claimed in claim 2, wherein the encrypted data are exchanged with a lower priority in comparison with the unencrypted data.

4. A process automation system as claimed in claim 1, wherein the encrypted data are exchanged with a lower priority in comparison with unencrypted data.

5. A process automation system as claimed in claim 3, wherein the process devices comprise memories that collect the encrypted data before the encrypted data are exchanged.

6. A process automation system as claimed in claim 1, further comprising a central key administration that registers public encryption keys of the process devices and authenticates the public encryption keys with a private encryption key of the central key administration.

* * * * *